United States Patent
Van Den Broeke

[11] Patent Number: 5,892,337
[45] Date of Patent: Apr. 6, 1999

[54] BLACK LEVEL SETTING

[75] Inventor: Leendert A. D. Van Den Broeke, Nijmegen, Netherlands

[73] Assignee: U.S. Philips Corporation, New York, N.Y.

[21] Appl. No.: 788,734

[22] Filed: Jan. 23, 1997

[30] Foreign Application Priority Data

Jan. 29, 1996 [EP] European Pat. Off. .............. 96200192

[51] Int. Cl.⁶ .................................................. H01J 29/52
[52] U.S. Cl. .......................................... 315/383; 348/379
[58] Field of Search .............................. 315/383; 348/379

[56] References Cited

U.S. PATENT DOCUMENTS 4,370,674  1/1983  Johnson et al. ............................ 358/74
5,278,476  1/1994  Ten Pierick et al. ................... 315/383

Primary Examiner—Theodore M. Blum
Attorney, Agent, or Firm—Edward W. Goodman

[57] ABSTRACT

In a method of black level and gain control setting, including the steps of applying (42) at least two mutually differing control values (Vd1, Vd2) in a first predetermined ratio, and controlling (35, 3, 7, 15) the black level and gain in response to the at least two mutually differing control values (Vd1, Vd2), at least two mutually differing reference values (Iref1, Iref2) in a second predetermined ratio and corresponding to the at least two mutually differing control values (Vd1, Vd2) are applied (47) to the controlling step (35, 3, 7, 15), where a predetermined relationship exists between the first predetermined ratio and the second predetermined ratio, a first error value depending on a first control value (Vd1) and a first reference value (Iref1) is integrated (43) to obtain a black level setting value, and a second error value depending on a second control value (Vd2) and a second reference value (Iref2) is integrated (44) to obtain a gain setting value.

7 Claims, 2 Drawing Sheets

BLACK LEVEL SETTING

BACKGROUND OF THE RELATED ART

1. Field of the Invention

The invention relates to a method and a circuit for black level setting, and to a display apparatus including a black level setting circuit.

2. Description of the Related Art

U.S. Pat. No. 5,278,476 (PHN 13,885), incorporated by reference herein, discloses a display apparatus including a black level setting circuit with a control circuit adapted to successively apply at least two control voltages, in a predetermined ratio, to the cathode of the display device. Moreover, the black level setting circuit includes a correction circuit for supplying a correction value dependent on the ratio between the currents generated in the relevant cathode in response to the at least two control voltages. The following formula is given for the cathode current Ik:

$$Ik=[(K*Vd)/Vco^{(1-1.5/\gamma)}]^{\gamma}$$

where Vd is the drive voltage, Vco is the cut-off voltage, and γ (gamma) is a quantity related to the display tube. In one embodiment, a multiplier circuit provides a gain control to ensure that an arbitrary video voltage applied to the input yields the same cathode current for all three electron guns (cathodes), provided that the factors K and γ are equal for all three cathodes.

SUMMARY OF THE INVENTION

It is, inter alia, an object of the invention to provide a black level setting which is less dependent on the factor K. To this end, a first aspect of the invention provides a black level and gain control setting device comprising means for applying at least two mutually differing control values in a first predetermined ratio; and means for controlling the black level and gain in response to said at least two mutually differing control values, characterized in that said black level and gain control setting device further comprises means for applying at least two mutually differing reference values in a second predetermined ratio and corresponding to said at least two mutually differing control values to said controlling means, where a predetermined relationship exists between said first predetermined ratio and said second predetermined ratio; first means for integrating a first error value depending on a first control value and a first reference value to obtain a black level setting value; and second means for integrating a second error value depending on a second control value and a second reference value to obtain a gain setting value. A second aspect of the invention provides a method of black level and gain control setting comprising the steps of applying at least two mutually differing control values in a first predetermined ratio; and controlling the black level and gain in response to said at least two mutually differing control values, characterized in that said method further comprises the steps of applying at least two mutually differing reference values in a second predetermined ratio and corresponding to said at least two mutually differing control values to said controlling step, where a predetermined relationship exists between said first predetermined ratio and said second predetermined ratio; integrating a first error value depending on a first control value and a first reference value to obtain a black level setting value; and integrating a second error value depending on a second control value and a second reference value to obtain a gain setting value. A, third aspect of the invention provides a display apparatus comprising a display device; and a black level and gain control setting device as set forth above, for providing a cathode current to said display device.

In accordance with a primary aspect of the invention, a method of black level and gain control setting which comprises the steps of applying at least two mutually differing control values in a first predetermined ratio, and controlling the black level and gain in response to the at least two mutually differing control values, is characterized in that at least two mutually differing reference values in a second predetermined ratio and corresponding to the at least two mutually differing control values are applied to the controlling step, where a predetermined relationship exists between the first predetermined ratio and the second predetermined ratio, a first error value depending on a first control value and a first reference value is integrated to obtain a black level setting value, and a second error value depending on a second control value and a second reference value is integrated to obtain a gain setting value.

In one embodiment, the magnitudes of the cathode currents obtained in response to the control values are compared to the respective reference values to obtain error values. In a control loop, these error values are controlled to zero. Consequently, the magnitude of the cathode current no longer depends on the gain of a cathode drive circuit, the cut-off voltage and the factor K in the above-mentioned cathode current formula, but is exclusively determined by the magnitudes of the control values and reference values.

It is noted that U.S. Pat. No. 4,370,674 discloses a stabilization network for a cathode ray tube which compensates for variable emission characteristics of a cathode in a television receiver's cathode ray tube. During the receiver's vertical interval, a variable gain video amplifier applies a black level DC voltage to the cathode. The resulting cathode current is sensed and compared to a low level reference current. If the cathode current does not equal the reference current, a control signal is applied to the amplifier. The amplifier responds to the control signal by changing its DC output voltage until the cathode current is equal to the reference current. The amplifier also responds to the control signal by altering its gain so that, when a video signal is received, the cathode develops peak white currents of a given value in response to peak white portions of the video signal. For example, a peak white reference current may be compared to cathode current in response to a simulated peak white output from the amplifier. This prior art document does not teach that the respective control signals for black level and gain control should be in a first predetermined ratio, that the reference currents for black level and gain control should be in a second predetermined ratio, and that there should be a predetermined relationship between the first and second ratios to obtain a control which does not depend on the various parameters (K, Vco) in the above-mentioned formula, but which solely depends on control value and reference value ratios which can be precisely determined.

These and other aspects of the invention will be apparent from and elucidated with reference to the embodiments described hereinafter.

In the drawings:

FIG. 1 shows a first embodiment of a display apparatus including a black level setting circuit in accordance with the present invention;

FIG. 2 shows a second embodiment of a display apparatus including a black level setting circuit in accordance with the present invention; and FIG. 3 illustrates some waveforms occurring in the black level setting circuit of FIGS. 1 and 2.

BRIEF DESCRIPTION OF THE DRAWINGS

In the display apparatus of FIG. 1, an input video signal Vin is applied to a switch 42, whose output is connected to a cathode 9 of a display device D thru a gain control circuit (e.g., a multiplier) 35, a level control circuit (e.g., an adder) 3, a buffer circuit 5, and a video output stage 7. A measuring circuit 15 subtracts a reference signal received from a switch 47, from a signal related to the output current Ik supplied to the cathode 9 and received from the video output stage 7. An error current Ie from the measuring circuit 15 is applied to integrators (e.g., capacitors) 43 and 44 thru switches 46 and 45, respectively. The control circuits 35 and 3 are controlled by output signals of integrators 44 and 43, respectively, which function as memory elements. In a non-calibration state of the display apparatus, the switches 42, 45, 46 and 47 are in the positions shown.

Calibration occurs in two phases. In a first phase of the calibration state, which occurs during a few measuring lines in a first field F1, a first control voltage Vd1 is supplied to the circuit by the switch 42, and a first reference current Iref1 is applied to the measuring circuit 15 by the switch 47. Moreover, switch 46 is closed. After some time, the cathode current Ik will have become equal to Iref1, so that the error current Ie is zero. In a second phase of the calibration state, which occurs during a few measuring lines in a second field F2, a second control voltage Vd2 is supplied to the circuit by the switch 42, and a second reference current Iref2 is applied to the measuring circuit 15 by the switch 47. Moreover, switch 45 is closed (switch 46 is open). After some time, the cathode current Ik will have become equal to Iref2, so that the error current Ie is zero. The calibration is effected during several iterations of the calibration cycle formed by the first phase followed, by the second phase, because of the mutual influence of gain control and level control.

Just like in the prior art black level setting of U.S. Pat. No. 5,278,476, two measurement voltages are applied to the cathode. By observing the ratio between the resulting measured cathode currents, the black level is set at the cut-off point of the cathode ray tube (CRT). Moreover, the gain of the video signal applied to the cathode is controlled. As only two measurements are carried out, the factor $\gamma$ of the cathode must be known. For usual CRTs, this means no limitation because the factor $\gamma$ is approximately constant ($\gamma=2.25$). New in the present invention is-that for an accurate gain control, it is no longer necessary that the level shifts and gain factors of the amplifiers 5 and 7, as well as the factor K of the cathode, are constant. This is especially relevant in color display systems where differences between these factors result in color errors. Also, the cut-off voltage Vco no longer influences the black level setting and the gain control. Moreover, the present invention offers the advantage that its implementation is very simple.

The ratios between the drive voltages Vd1 and Vd2 and the reference currents Iref1 and Iref2 follow from the observation that for a correctly set black level, it holds that $(Vd1/Vd2)^\gamma=Iref1/Iref2$. To guarantee convergence of the iterative control, Vd2 should exceed Vd1. In a preferred embodiment, $Vd1/Vd2=2/3$, and $Iref1/Iref2=2/5$, which ratios can easily be realized. When $\gamma=2.25$, only a small error is made. The ratio to be selected between Vd1 and Iref1 (or between Vd2 and Iref2) depends on the desired gain of the transfer function. After calibration, the transfer function is given by: $Ik=Iref1, Iref2*(Vin/Vd1, Vd2)^\gamma$. The absolute values of Vd1, Vd2 and Iref1, Iref2 do not influence the black level or the gain. In the embodiment, a compromise has been sought between interference-susceptibility (which determines the minimum values of Vd1, Vd2 and Iref1, Iref2) and visibility of the measurement lines (which determine the maximum values of Vd1, Vd2 and Iref1, Iref2).

In a color display system, there are three sets of circuits 42, 35, 3, 5, 7, 43–46, i.e., one set per cathode. Only one measuring circuit 15 and only one switch 47 are needed because the three cathode currents are taken together. Consequently, the three cathodes can not be calibrated together, but must be calibrated during successive measuring lines as will be illustrated by means of FIG. 3.

Figure 1:
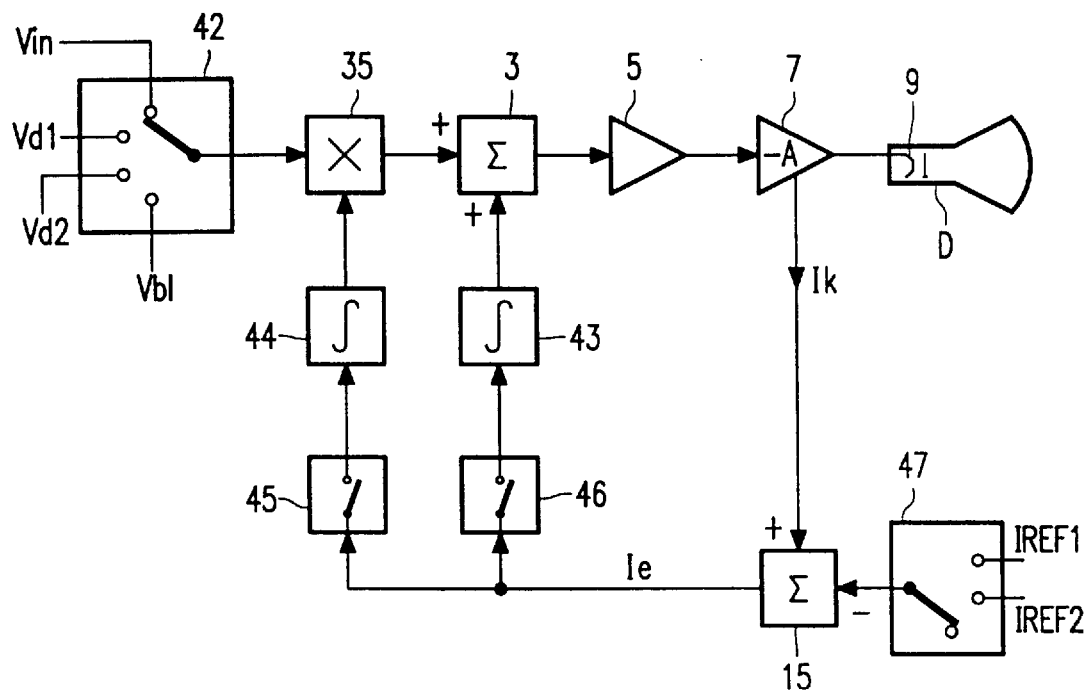
Figure 2:
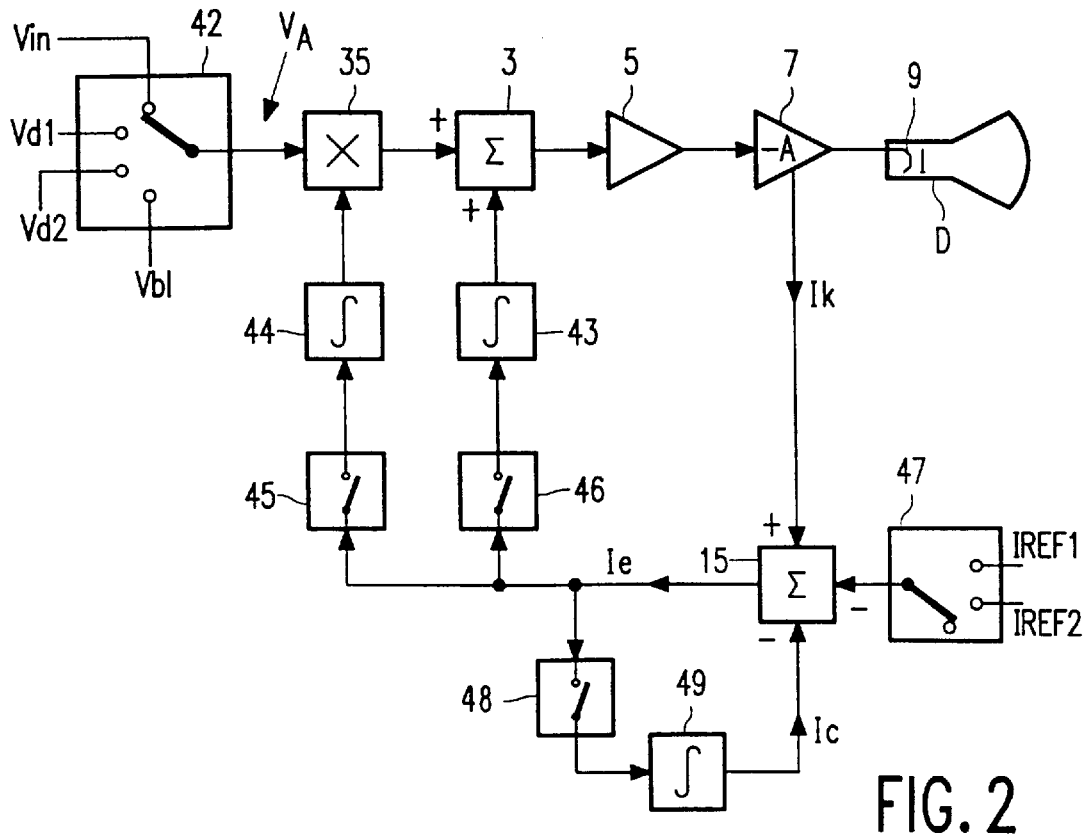

In the embodiment of FIG. 2, an arrangement 48, 49 is present in addition to the elements of FIG. 1, to compensate for leakage currents and for line frequency interference currents to the cathode connections. The switches 42 apply blanking voltages Vb1 so that no current is applied to the cathodes. The switch 47 is in the position shown. The switch 48 is closed, so that the error current Ie is integrated by integrator 49 to set a compensation current Ic which compensates for all leakage and interference currents. After opening switch 48, the integrator 49 maintains the compensation current Ic. The measuring circuit 15 subtracts the compensation current Ic from the difference between the cathode current Ik and the reference current Iref1,2.

Figure 3:
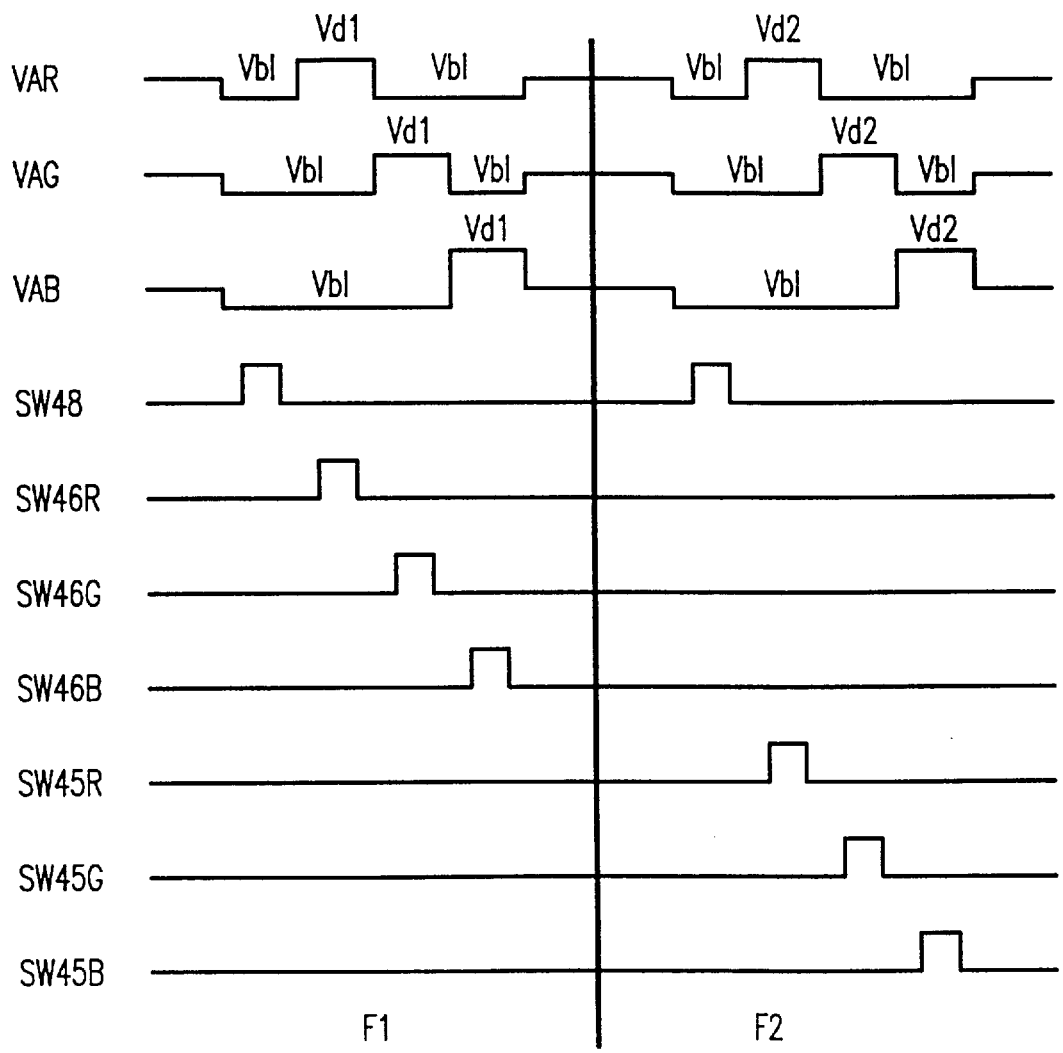

FIG. 3 illustrates a complete calibration cycle. In the first field F1, in one of the first image lines the blanking voltage Vb1 is offered to all three cathodes 9. VAR indicates the voltage applied to the red channel of the circuit, VAG indicates the voltage applied to the green channel, and VAB indicates the voltage applied to the blue channel. The total leakage/interference current is measured and compensated for by closing switch 48 during this image line (see line SW48 in FIG. 3). During the next image line, the red channel is calibrated: its switch 46 is closed (see line SW46R in FIG. 3), and the control voltage Vd1 is supplied by its switch 42. In the other channels, the blanking voltage Vb1 is supplied by their respective switches 42 so that the green and blue cathode currents do not influence calibration in the red channel. During the next image line, the green channel is calibrated: its switch 46 is closed (see line SW46G in FIG. 3). During the fourth image line used for calibration, the blue channel is calibrated: its switch 46 is closed (see line SW46B in FIG. 3). The second phase which is carried out during a subsequent field F2, resembles the first phase to a large extent. Instead of switches 46R, 46G and 46B, switches 45R, 45G and 45B are successively closed during the second, third and fourth image lines used for calibration.

It should be noted that the above-mentioned embodiments illustrate rather than limit the invention, and that those skilled in the art will be able to design many alternative embodiments without departing from the scope of the appended claims. For example, three control values and three reference values may be used to obtain a $\gamma$-independent control. The invention can be implemented by means of hardware comprising several distinct elements, and by means of a suitably programmed computer.

I claim:

1. A black level and gain control setting device, comprising:

means for applying at least two mutually differing control values in a first predetermined ratio; and means for controlling the black level and gain in response to said at least two mutually differing control values, characterized in that said black level and gain control setting device further comprises:

means for applying at least two mutually differing reference values, in a second predetermined ratio and corresponding to said at least two mutually differing control values, to said controlling means, where a predetermined relationship exists between said first predetermined ratio and said second predetermined ratio;

first means for integrating a first error value depending on a first control value and a first reference value to form a black level setting value; and second means for integrating a second error value depending on a second control value and a second reference value to form a gain setting value.

2. A black level and gain control setting device as claimed in claim 1, characterized in that said black level and gain control setting device further comprises:

third means for integrating a third error value corresponding to leakage and interference currents, to form a compensation value for compensating said controlling means for leakage and interference currents.

3. A black level and gain control setting device as claimed in claim 1, wherein said first control value and said first reference value are applied, and said first error value is integrated, during a first calibration phase, and wherein said second control value and said second reference value are applied, and said second error value is integrated, during a second calibration phase.

4. A black level and gain control setting device as claimed in claim 1, wherein said predetermined relationship between said first predetermined ratio and said second predetermined ratio is $(Vd1/Vd2)^\gamma = Iref1/Iref2$, where $Vd1/Vd2$ is said first predetermined ratio, $Iref1/Iref2$ is said second predetermined relation and $\gamma$ is a quantity related to a display tube.

5. A black level and gain control setting device as claimed in claim 4, wherein said first predetermined ratio is 2/3, and said second predetermined ratio is 2/5.

6. A method of black level and gain control setting, comprising the steps:

applying at least two mutually differing control values in a first predetermined ratio; and controlling the black level and gain in response to said at least two mutually differing control values, characterized in that said method further comprises the steps:

applying at least two mutually differing reference values, in a second predetermined ratio and corresponding to said at least two mutually differing control values, to said controlling step, where a predetermined relationship exists between said first predetermined ratio and said second predetermined ratio;

integrating a first error value depending on a first control value and a first reference value to form a black level setting value; and integrating a second error value depending on a second control value and a second reference value to form a gain setting value.

7. A display apparatus, comprising:

a display device; and a black level and gain control setting device, for providing a cathode current to said display device, wherein said black level and gain control setting device comprises:

means for applying at least two mutually differing control values in a first predetermined ratio; and means for controlling the black level and gain in response to said at least two mutually differing control values, characterized in that said black level and gain control setting device further comprises:

means for applying at least two mutually differing reference values, in a second predetermined ratio and corresponding to said at least two mutually differing control values, to said controlling means, where a predetermined relationship exists between said first predetermined ratio and said second predetermined ratio;

first means for integrating a first error value depending on a first control value and a first reference value to form a black level setting value; and second means for integrating a second error value depending on a second control value and a second reference value to form a gain setting value.

* * * * *